(12) United States Patent
Johnson

(10) Patent No.: US 10,471,964 B2
(45) Date of Patent: Nov. 12, 2019

(54) SYSTEM AND METHOD FOR COLLECTING VEHICLE USE AND DRIVING BEHAVIOR DATA USING A MOBILE COMMUNICATION DEVICE AND BLUETOOTH LOW ENERGY (BLE) DEVICE

(71) Applicant: Jon Brandon Johnson, Huntington Beach, CA (US)

(72) Inventor: Jon Brandon Johnson, Huntington Beach, CA (US)

(73) Assignee: WPJ HOLDINGS, INC., Huntington Beach, CA (US)

( * ) Notice: Subject to any disclaimer, the term of this patent is extended or adjusted under 35 U.S.C. 154(b) by 0 days.

(21) Appl. No.: 14/879,934

(22) Filed: Oct. 9, 2015

(65) Prior Publication Data

US 2016/0101786 A1    Apr. 14, 2016

Related U.S. Application Data

(60) Provisional application No. 62/062,742, filed on Oct. 10, 2014.

(51) Int. Cl.
| | |
|---|---|
| *B60W 40/09* | (2012.01) |
| *H04L 29/08* | (2006.01) |
| *G01S 19/01* | (2010.01) |
| *H04W 4/80* | (2018.01) |
| *G01S 19/34* | (2010.01) |
| *G01S 5/00* | (2006.01) |

(52) U.S. Cl.
CPC ........... *B60W 40/09* (2013.01); *G01S 5/0027* (2013.01); *G01S 19/01* (2013.01); *G01S 19/34* (2013.01); *H04L 67/12* (2013.01); *H04W 4/80* (2018.02)

(58) Field of Classification Search
None
See application file for complete search history.

(56) References Cited

U.S. PATENT DOCUMENTS

| | | |
|---|---|---|
| 2010/0208070 A2 | 8/2010 | Haynes et al. |
| 2011/0092159 A1 | 4/2011 | Park et al. |
| 2012/0164989 A1 | 6/2012 | Xiao et al. |
| 2013/0006675 A1* | 1/2013 | Bowne ............... G06Q 10/0639 705/4 |
| 2013/0013348 A1 | 1/2013 | Ling et al. |
| 2013/0046510 A1 | 2/2013 | Bowne et al. |
| 2013/0295900 A1 | 11/2013 | Hood |
| 2013/0316310 A1* | 11/2013 | Musicant ............... G01P 15/003 434/65 |
| 2014/0005917 A1* | 1/2014 | Leggett ............... B60R 16/0236 701/123 |

(Continued)

*Primary Examiner* — Nicholas K Wiltey
(74) *Attorney, Agent, or Firm* — Leopold Lueddemann

(57) ABSTRACT

A system and method for collecting motor vehicle use, driving behavior or motor vehicle use and driving behavior data using a Bluetooth® low energy ("BLE") device and a mobile communication device ("MCD"). One embodiment can automatically turn on the MCD Global Positioning System location services ("GPS") and start the collection of such data when the MCD user is in a predetermined proximity of the motor vehicle and the vehicle is in motion as well as automatically turn off the GPS and stop data collection when the MCD is not in a predetermined proximity to the motor vehicle and BLE device and the motor vehicle stops moving.

7 Claims, 5 Drawing Sheets

(56) References Cited

U.S. PATENT DOCUMENTS

2014/0028477 A1* 1/2014 Michalske ............. G08G 1/005
 340/990
2014/0257867 A1 9/2014 Gay et al.
2014/0335902 A1* 11/2014 Guba ................... H04W 4/027
 455/456.4

* cited by examiner

SYSTEM AND METHOD FOR COLLECTING VEHICLE USE AND DRIVING BEHAVIOR DATA USING A MOBILE COMMUNICATION DEVICE AND BLUETOOTH LOW ENERGY (BLE) DEVICE

CROSS REFERENCE TO RELATED APPLICATIONS

This application claims the benefit of U.S. Provisional Patent Application No. 62/062,742 filed Oct. 10, 2014, entitled "System and Method for Collecting Vehicle Use and Driving Behavior Data Using A Mobile Communication Device and Bluetooth Low Energy (BLE) Device", the disclosure of which is incorporated by reference herein in its entirety.

FIELD OF THE INVENTION

A system and method for collecting vehicle use and driving behavior data using a Bluetooth® Low Energy ("BLE") device and a mobile communication device. The system and method can automatically start the collection of vehicle use data, driver behavior data or vehicle use data and driver behavior data when a mobile communication device, with software loaded onto the mobile communication device ("mobile communication device"), is in a predetermined proximity to a BLE device and vehicle motion is detected. The system and method automatically stops the collection of vehicle use data, driver behavior data or vehicle use and driver behavior data when the vehicle is no longer in motion and the mobile communication device is no longer in a predetermined proximity to a BLE device.

BACKGROUND OF THE INVENTION

The use of specialized devices to collect vehicle use, driver behavior data and control mobile device use, and in particular a mobile (cellular) telephone use, while driving is well known in the art. For example, insurance companies issue rates, offer discounts and even quote rates to individuals based on data of driving behavior and/or vehicle use (herein "Vehicle Use"). The Vehicle Use data is often collected by permanently installing specialized hardware, by plugging a specialized telematics device into the OBD II port found in most late-model motor vehicles, or by plugging specialized hardware into another power source within a motor vehicle. For example, location, extreme deceleration, acceleration, distance traveled, operating parameters and other Vehicle Use data can be collected in this manner. The data collected by these specialized devices is generally on a trip-by-trip basis and is transmitted and stored for later assessment. Some current methods to collect the Vehicle Use data include transmission of vehicle use data from the OBD II port device to a second device, including mobile communication devices, in the motor vehicle designed to store the Vehicle Use data. Other known methods to collect vehicle use data include transmission from the OBD II port device over a network to a remote device designed to store the Vehicle Use data.

However, many of these various devices need to be manually started and stopped for each "driving trip" to collect and store the Vehicle Use data, require mounting of special hardware in or about the motor vehicle or drain the motor vehicle's battery by keeping the vehicle's engine control unit active at times when the vehicle is not being driven.

Recently, mobile communication devices, and in particular mobile "smart" phones, with specific software applications loaded onto the mobile communication devices, are being used to detect vehicle motion and store Vehicle Use data using the mobile communication device Global Positioning System ("GPS") location services, accelerometer, gyroscope, and other mobile communication device functions, but with several significant drawbacks. For example, the automatic initiation of a trip in a motor vehicle for monitoring and recording purposes using a mobile communication device requires that the mobile communication device GPS positioning function remain active resulting in significant battery drain; battery preservation is an important consideration in mobile communication devices, especially in mobile phones. Further, such systems relying solely on GPS location services to determine "driving trips" can be unreliable, as GPS systems in mobile communication devices are not always accurate, for example when the GPS-equip mobile communication device is in an underground parking structure. In addition, a mobile communication device may also be required to establish a connection ("pair") with the motor vehicle Bluetooth® system to initiate Vehicle Use data collection and storage. However, the vast majority of motor vehicles are non-Bluetooth®-equip, thereby rendering this method nonfunctional in such non-Bluetooth® motor vehicles.

What is needed is a fast, secure and convenient system and method to enable a mobile communication device to "pair" with all vehicles automatically while extending the mobile communication device battery life to collect vehicle use, driving behavior or vehicle use and driving behavior data.

SUMMARY OF THE INVENTION

This Summary introduces features and simplified concepts of system and method for collecting vehicle use and driving behavior data using a mobile communication device and Bluetooth® low energy (BLE) device, which is further described below in the Detailed Description and/or shown in the Figures. This Summary should not be considered to describe essential features of the claimed subject matter, nor used to determine or limit the scope of the claimed subject matter.

System and method for collecting vehicle use and driving behavior data using a mobile communication device and Bluetooth® low energy (BLE) device is described. It is therefore an object of the embodiments to provide a fast, secure and convenient way for a mobile communication device to automatically collect vehicle use, driving behavior or vehicle use and driving behavior data.

It is yet another object of the embodiments is to overcome the limitations inherent in the various Vehicle Use data collection devices referenced above, including mobile communication devices, by using software loaded on a mobile device in conjunction with the Bluetooth® Low Energy ("BLE") device.

The preferred embodiment on relates to the use of software loaded on a mobile communication device that detects BLE devices and motor vehicle motion to automatically collect and store vehicle use data, driver behavior data or vehicle use and driver behavior data using sensors built into the mobile communication device, including turning on and off the GPS location services of the mobile communication device.

DETAILED DESCRIPTION

Embodiments of system and method for collecting vehicle use and driving behavior data using a mobile communication device and Bluetooth® low energy (BLE) device are described and provide a vehicle use and driving behavior data collection and storage service that can be implemented as a mobile communication device service or application, such as in a mobile phone, portable tablet device, or other type of computing and/or communication device. The vehicle use data collection and storage and driving behavior data collection and storage places a mobile communication device in a mode that collects and stores vehicle use and/or driving behavior data by and on the mobile communication device while the mobile communication device user is operating a motor vehicle.

Figure 1:
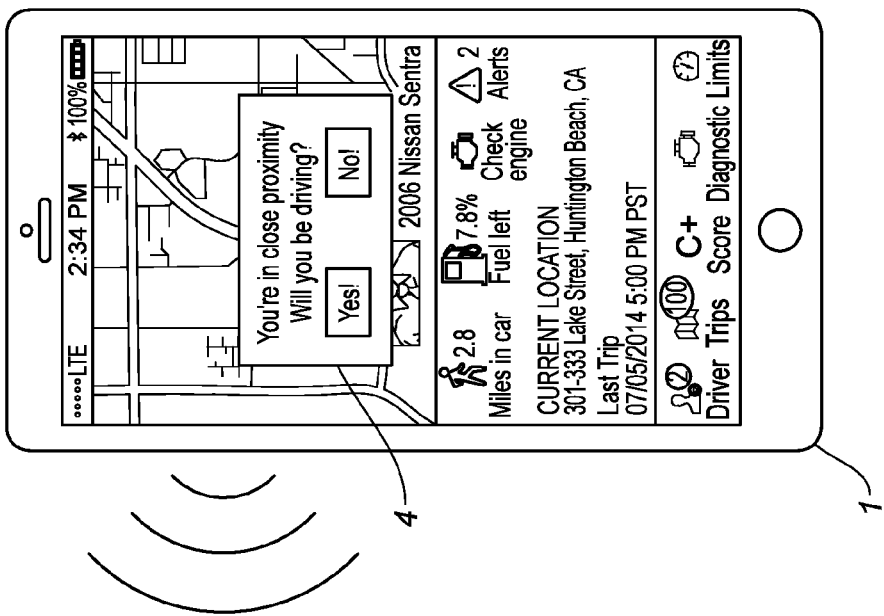
FIG. 1 illustrates an example of the mobile communication device software interface when the mobile communication device is less than ten meters to a BLE device.
Figure 1:
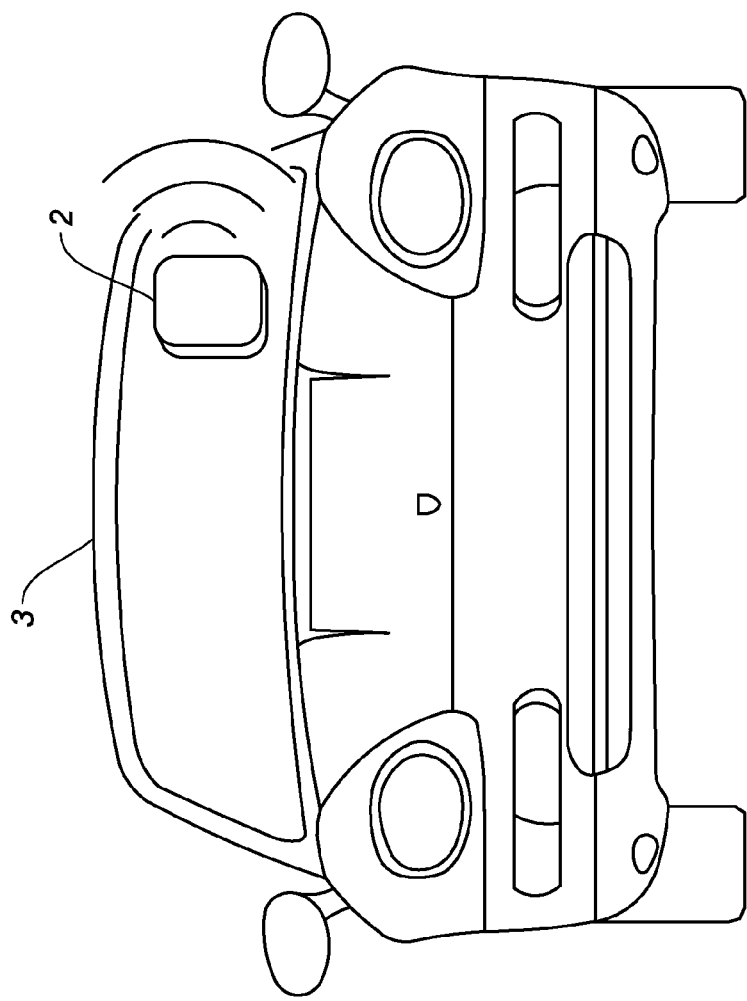

FIG. 1. illustrates an example of the software interface on an integrated display of a mobile communication device 1 once the mobile communication device is less than ten meters to a BLE device 2 placed in a motor vehicle 3 and the vehicle use and/or driving behavior collection and storage mode is automatically activated. In the preferred embodiment, the mobile communication device 1 is between four to ten meters from the BLE device. 2 In the preferred embodiment, the mobile communication device will automatically initiate the collection and storage of driver behavior data, vehicle use data or driver behavior and vehicle use data by turning on the mobile communication device GPS location services (not shown) and the mobile communication device detecting motor vehicle movement. In the preferred embodiment, motor vehicle movement is detected with the mobile communication device GPS location services. In another embodiment, motor vehicle movement is detected by the mobile communication device with motor vehicle speed. In yet another embodiment, the motor vehicle movement is detected with vehicle speed and GPS location services by the mobile communication device. The collection of driver behavior, vehicle use or driver behavior and vehicle use data by the mobile communication device will then begin. The vehicle use data collection and storage and driving behavior data collection and storage is accomplished by the mobile communication device, therefore independent of the vehicle. The mobile communication device enables the mobile communication device user and potential operator of a motor vehicle to refuse data collection with a communication ("notification") from the mobile communication device and confirm whether it is the mobile communication device user's intent not to operate the motor vehicle. 4 If the mobile communication device user indicates an intent not to operate the motor vehicle, the user's mobile communication device will not turn on the GPS location services of the mobile communication device and will not initiate and store vehicle use data, driver behavior data or vehicle use and driving behavior data.

Figure 2:
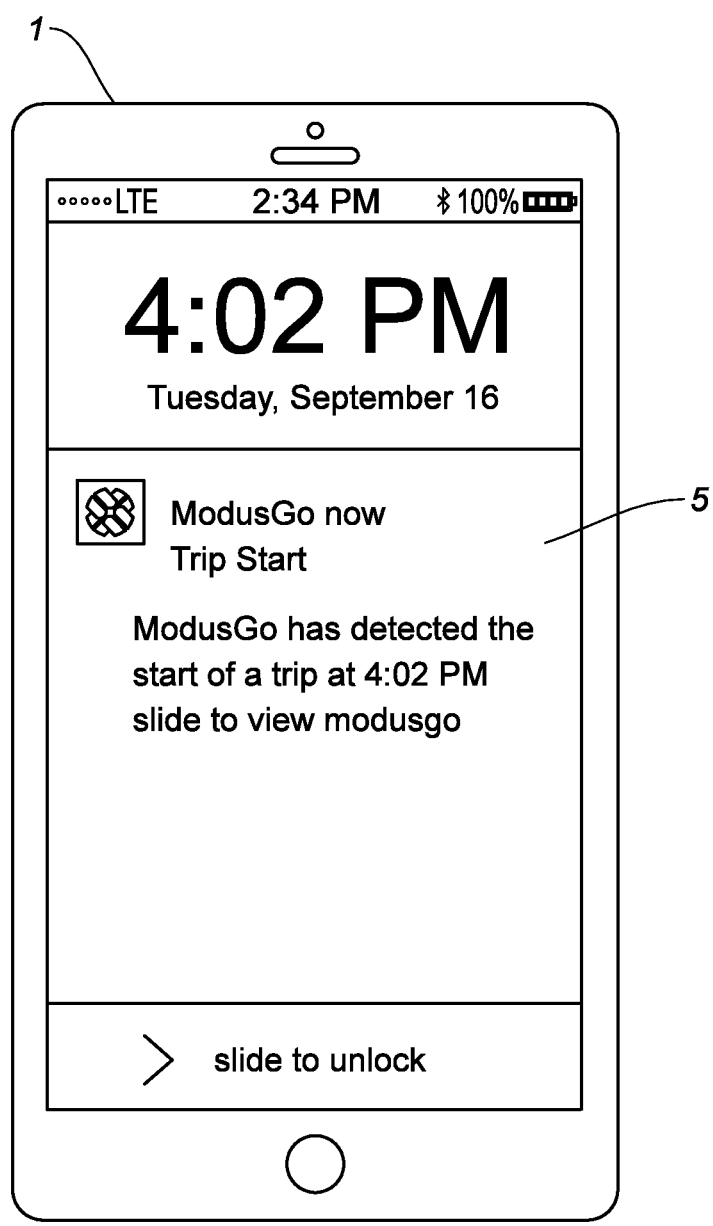
FIG. 2 illustrates an example of the software interface on a mobile communication device once the mobile communication device software is actively tracking the driving trip.

FIG. 2. illustrates an example of the mobile communication device software interface on a mobile communication device 1 once the software is actively tracking the driving trip. 5

Figure 3:
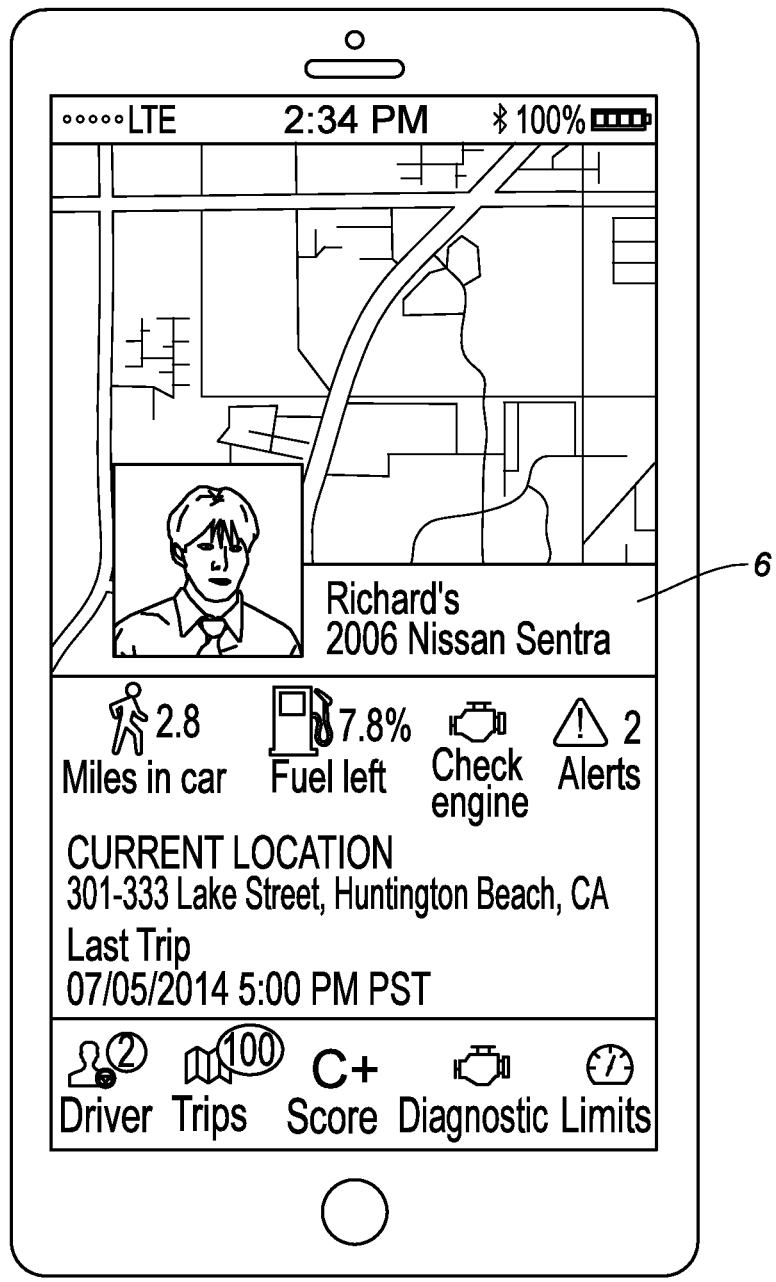
FIG. 3 illustrates an example of the software interface on a mobile communication device displaying the collection and storage of driving behavior, vehicle use or driving behavior and vehicle use trip information.

FIG. 3. illustrates an example of the mobile communication device software interface when a driving trip is completed. 6 In the preferred embodiment, the mobile communication device has detected the BLE device is between four to ten meters and motor vehicle motion has stopped by accessing the mobile communication device GPS location services. In another embodiment, the mobile communication device has detected motor vehicle motion has stopped by vehicle speed. In yet another embodiment, the mobile communication device has detected motor vehicle motion has stopped by vehicle speed and GPS location services. The GPS location services of the mobile communication device have been turned off (not shown) by the embodiment as a result. In yet another embodiment, vehicle motion is detected using a plurality of mobile communication device services, including those listed herein.

Figure 4:
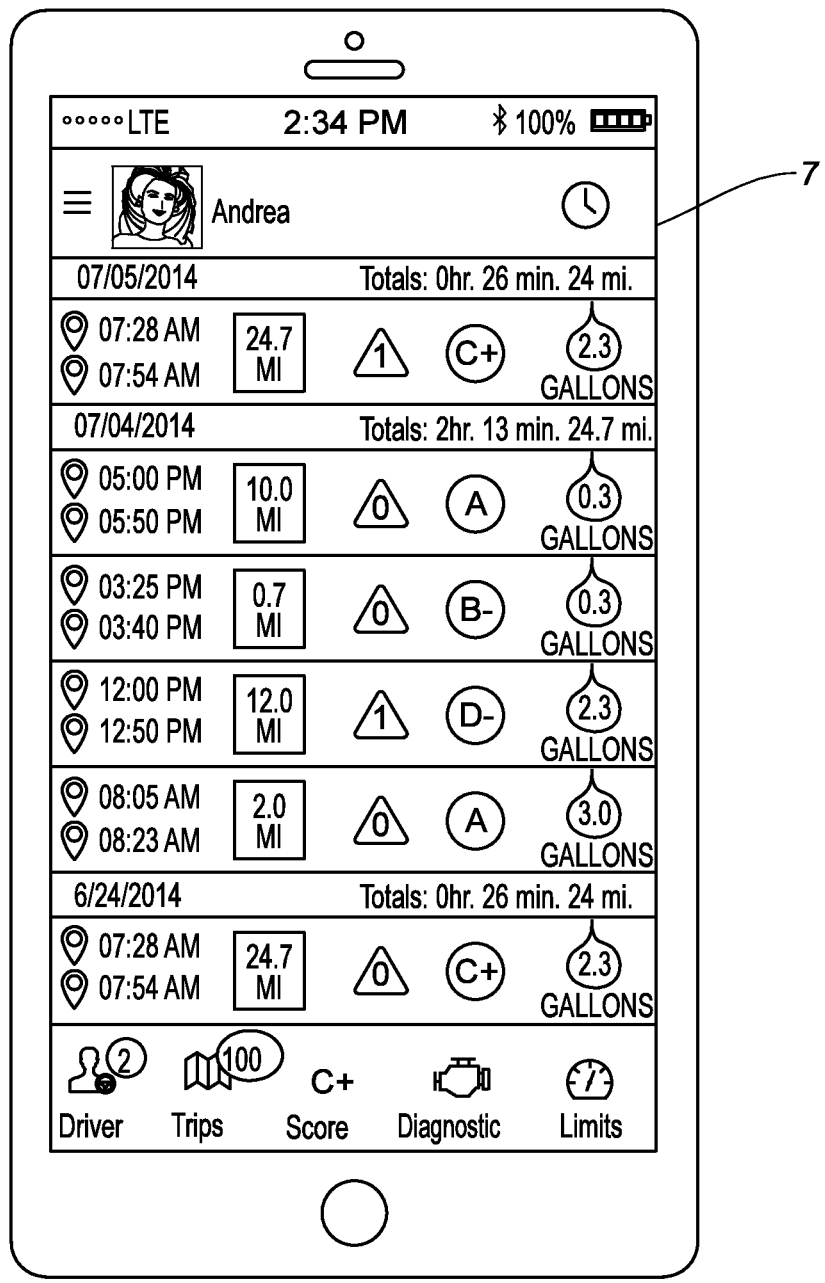
FIG. 4 illustrates an example of the software interface on a mobile communication device once the motor vehicle is no longer in motion, the mobile device is no longer less than ten meters to a BLE device and the software and mobile communication device has thereby determined the a driving trip is completed.

FIG. 4. illustrates an example of the mobile communication device software interface displaying the mobile communication device collection and storage of driving behavior, vehicle use or driving behavior and vehicle use trip information. 7

Figure 5:
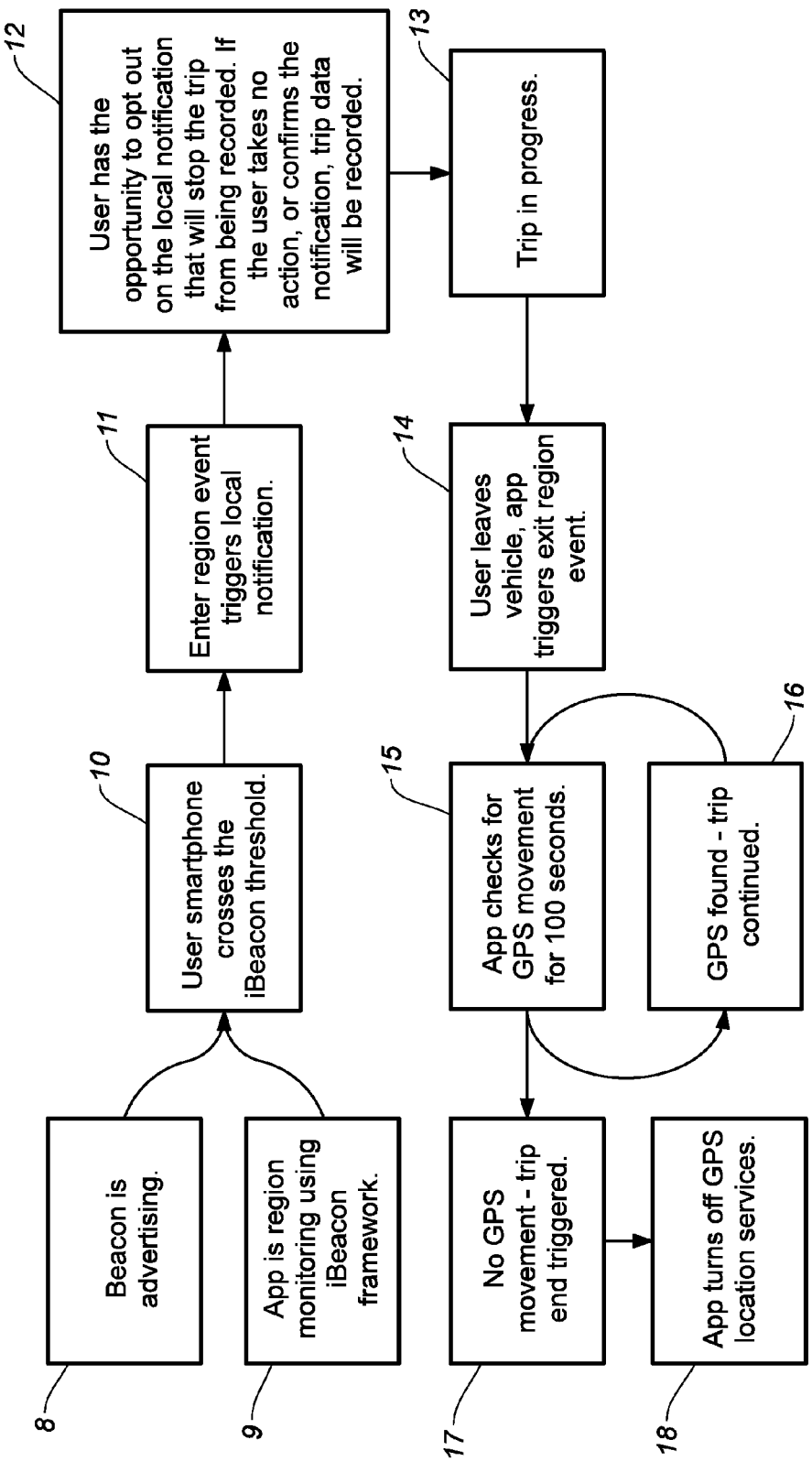
FIG. 5 illustrates a flow diagram of how the mobile communication device and BLE device interact to detect the start and stop of a driving trip.

FIG. 5. illustrates an exemplary block diagram of the Bluetooth® low energy ("BLE") device serving as a beacon advertising its location 8 and the mobile communication device is monitoring for BLE beacon signals (using an iBeacon or similar framework) 9 to detect when the monitoring mobile communication device enters into a predetermined proximity to the BLE device (crosses and enters a BLE device threshold proximity). 10 The BLE device is detected ("event trigger") by the mobile communication device and the mobile communication device automatically turns on the mobile communication device GPS location services and displays the mobile communication device user a notification on the mobile communication device. 11 If the mobile communication device user does not respond to the notification ("takes no action"), or responds to the notification in a predetermined manner ("confirms" the notification), driver behavior data, vehicle use data or driver behavior and vehicle use data will be collected and stored. 12 Movement of the motor vehicle may also initiate ("trigger") the collection and storage of driver behavior data, vehicle use data or driver behavior and vehicle use data by the mobile communication device. (not shown)

If the mobile communication device user responds in the negative to the notification, thereby denying intent to operate the motor vehicle and also thereby refusing collection and storage of vehicle driver behavior, vehicle use or driver behavior and vehicle use data, the mobile communication device software will not store trip data and ensure the GPS location services are turned off. (not shown) If the mobile communication device application instructions cause the mobile communication device to store motor vehicle driver behavior data, vehicle use data or vehicle driver behavior data and vehicle use data by detecting that the vehicle is in motion and therefore a motor vehicle "trip" is occurring as indicated herein, the vehicle use data, driver behavior or driver behavior and vehicle use data will be collected and stored while the trip is in progress. However, when the mobile communication device leaves the vehicle and BLE device proximity threshold, an application "exit region event" is triggered. In an exit region event, and in the preferred embodiment, the mobile communication device will check for vehicle movement by monitoring GPS for a predetermined period, such as 120 seconds, and if a GPS is found and it is determined the vehicle is in motion, the mobile communication device will continue to collect and store vehicle driver behavior data, vehicle use data or vehicle driver behavior and vehicle use data. On the other hand, if no vehicle movement is detected in an exit region event, the trip is ended ("stopped") and the mobile communication device will not store any further vehicle driver behavior data, vehicle use data or vehicle driver behavior and vehicle use data as well as turn off the GPS location services of the mobile communication device. In another embodiment, the mobile communication device will check for vehicle movement by monitoring speed for one hundred and twenty seconds. In yet another embodiment, vehicle motion is detected using a plurality of mobile communication device services, including those listed herein.

The embodiments system comprising a mobile communication device input system adapted to receive BLE device input and execute computer instructions ("application") as motor vehicle use, vehicle driver behavior or vehicle use and vehicle driver behavior ("Vehicle Use") data collection and storage service that is configured to launch a motor Vehicle Use data collection and storage when a motor vehicle is in motion and operated by the mobile communication device user, stop said motor Vehicle Use data collection and storage when a motor vehicle, operated by said mobile communication device user, is no longer in longer in motion and is not in a less than ten meters proximity to the BLE device, and store said collected motor vehicle Vehicle Use data. In the preferred embodiment, the motor vehicle motion is determined by the mobile communication device GPS location services. In another embodiment, the motor vehicle motion is determined by speed. In yet another embodiment, motor vehicle motion is determined by mobile communication device GPS locations services and speed. In still another embodiment, motor vehicle motion is detected by a plurality of mobile communication device services, including GPS location services, speed, and other mobile communication device services. The executable computer instructions further cause the mobile communication device to enable the mobile communication device user to refuse the motor vehicle use and driver behavior data collection and storage. Finally, the determination as to whether the vehicle trip is ended ("stopped") is determined by a lack of vehicle motion in one hundred and twenty seconds. The 120 seconds (may be for the duration of 100 seconds or can be set for some other period). If the vehicle motion is detected within the 120 seconds or some other predetermined time period, vehicle use data, driver behavior data or vehicle use and driver behavior collection and storage is maintained.

Unless specifically stated otherwise, discussions herein using words such as "processing," "computing," "determining," "displaying" or the like may refer to actions or processes of a machine (e.g., a computer as well as mobile communication device) that manipulates or transforms data represented as physical (e.g., electronic, magnetic or optical) quantities with one or more memories (e.g., volatile memory, non-volatile memory or a combination thereof), registers or other machine components that receive, store, transmit or display information.

As used herein, the use of "mobile communication device" is employed to refer to a machine (e.g., a mobile cellular phone, mobile cellular tablet or the like) with embodiments software loaded onto the machine. Additionally, and unless stated otherwise, discussions herein using words such as "ended," "stopped" or the like refer to actions or processes which have ceased, whether permanently or temporarily. As used herein, the term "vehicle" may refer to any number of motorized transportation devices, including without limitation a car, truck, train, boat, plane, motorcycle or other personal transport device. Further, a "trip" as used herein may refer to one use of a motor vehicle to travel from one location to a terminal location. As used herein, the terms "software" or "application" may be used interchangeably. Still further, "GPS" may include a positioning system, such as Global Position System (GPS), Assisted-GPS (A-GPS), or similar geographical positioning system, to determine geographic location data and motion data that indicates the device is moving and possibly the speed or acceleration at which the device is moving, such as in a motor vehicle.

Further, the use of Bluetooth® and BLE as used herein, as well as many Bluetooth® specific terms known to those skilled in the art, are as set forth in the Speciation of the Bluetooth® System, version 4.0, dated Dec. 3, 2013, available online from the Bluetooth® Special Interest Group, which are herein incorporated by reference in their entirety for all purposes, as if set forth in full herein.

Upon reading this disclosure, those of skill in the art will appreciate still additional alternative structural and function designs for a computer system and computer-implemented method to provide collecting vehicle use, driving behavior or vehicle use and driving behavior data using a Bluetooth® low energy device and a mobile communication device. Thus, while particular embodiments and applications have been illustrated and described, it is to be understood that the disclosed embodiments are not limited to the precise construction and components disclosed herein. Additionally, variants of additional embodiments are possible. Therefore, the spirit and scope of the appended claims and the concepts taught herein should not be limited to the description of the preferred embodiments and embodiments contained herein.

The invention claimed is:

1. A method of collecting motor vehicle driver behavior and motor vehicle use data of a motor vehicle by a mobile communication device independent of a motor vehicle, the method comprising the steps of:

detecting a beacon low energy device in said motor vehicle;

launching a mobile communication device vehicle driver behavior and vehicle use mobile communication device Global Positioning System data collection application;

determining that said mobile communication device is associated with the operator of said motor vehicle;

enabling a non-operator of said motor vehicle to refuse and prohibit said launching of said vehicle driver behavior data collection and storage said vehicle use data and storage and said mobile communication device Global Positioning System application;

determining when said motor vehicle is in motion by the mobile communication device Global Positioning System;

executing vehicle driver behavior data collection and storage and motor vehicle use data collection and storage;

detecting when said motor vehicle is no longer in motion for 120 seconds;
detecting the absence of said beacon low energy device;
stopping said mobile communication device driver behavior data collection and storage and said vehicle use data collection and storage and said mobile communication device Global Positioning System.

2. The method of claim 1 further comprising detecting said motor vehicle motion by speed of said motor vehicle.

3. The method of claim 2 further comprising continuation of said vehicle driver behavior data collection and storage and said vehicle use data collection and storage when said motor vehicle resumes motor vehicle motion.

4. A system comprising:
a mobile communication device input system adapted to receive beacon low energy device input and execute computer instructions as a motor vehicle driver behavior to:
launch motor vehicle driver behavior data collection and storage and vehicle use data collection and storage and mobile communication device Global Positioning System when said mobile communication device, independent of said motor vehicle, is less than ten meters of said beacon low energy device and a motor vehicle operated by the mobile communication device user is in motion;
said executable computer instructions further cause said mobile communication device to enable said mobile communication device user and non-operator of said motor vehicle to refuse and prohibit launching of said motor vehicle driver behavior data collection and storage and said vehicle use data collection and storage and said mobile communication device Global Positioning System;
detect when said motor vehicle is in motion by the mobile communication device Global Positioning System; and
stop said motor vehicle driver behavior data collection and storage and said vehicle use data collection and storage and mobile communication device Global Positioning System when said motor vehicle, operated by said mobile communication device user, is no longer in motion for 120 seconds and greater than ten meters of said beacon low energy device.

5. The system of claim 4 further comprising detecting said motor vehicle motion by speed of said motor vehicle.

6. The system of claim 4 further comprising continuation of said driver behavior data collection and storage and said vehicle use data collection and storage when said motor vehicle is again in motion.

7. A method of collecting motor vehicle driver behavior and motor vehicle use data of a motor vehicle by a mobile communication device independent of a motor vehicle, the method comprising the steps of:
detecting a beacon low energy device in said motor vehicle;
launching a mobile communication device vehicle driver behavior and vehicle use mobile communication device Global Positioning System data collection and storage and mobile communication device Global Positioning System application;
determining that said mobile communication device is associated with the operator of said motor vehicle;
enabling a non-operator of said motor vehicle to refuse and prohibit said launching of said vehicle driver behavior data collection and storage said vehicle use data and storage and said mobile communication device Global Positioning System application;
determining when said motor vehicle is in motion by the mobile communication device Global Positioning System;
executing vehicle driver behavior data collection and storage and motor vehicle use Global Positioning System mobile communication device data collection and storage;
detecting when said motor vehicle is no longer in motion for 120 seconds;
detecting the absence of said beacon low energy device;
stopping said driver behavior data collection and storage and said vehicle use data collection and said Global Positioning System mobile communication device;
continuing said vehicle driver behavior data collection and storage and said vehicle use Global Positioning System mobile communication device data collection and storage when said motor vehicle is again in motion.

* * * * *